United States Patent [19]

Garrett et al.

[11] Patent Number: 5,440,117
[45] Date of Patent: Aug. 8, 1995

[54] ROTATING WAVEPLATE SYSTEM WITH AVERAGING OF THE DETECTED SIGNAL TO COMPENSATE FOR POLARIZATION DEPENDENCE

[75] Inventors: Carey M. Garrett, Kanata; John O. Smiley, Ottawa, both of Canada

[73] Assignee: JDS Fitel Inc., Nepean, Canada

[21] Appl. No.: 183,857

[22] Filed: Jan. 21, 1994

[51] Int. Cl.⁶ ............................................. G02F 1/01
[52] U.S. Cl. ..................................... 250/225; 356/33
[58] Field of Search .................. 250/225, 227.17; 356/367, 368, 33, 366

[56] References Cited

U.S. PATENT DOCUMENTS

| | | | |
|---|---|---|---|
| 3,917,408 | 11/1975 | Stachnik | 356/116 |
| 3,982,204 | 9/1976 | Andringa | 331/94.5 D |
| 4,171,908 | 10/1979 | Robert et al. | 356/33 |
| 4,654,529 | 3/1987 | Boulay et al. | 250/341 |
| 5,076,696 | 12/1991 | Cohn et al. | 356/369 |
| 5,329,357 | 7/1994 | Bernoux et al. | 356/369 |

OTHER PUBLICATIONS

*High-Resolution Measurement of Polarization Dependent Loss*, Bruce M. Nyman and Gregory Wolter, IEEE Photonics Technology Letters, vol. 5, No. 7, Jul. 1993.

*Primary Examiner*—Edward P. Westin
*Assistant Examiner*—Steven L. Nichols
*Attorney, Agent, or Firm*—Thomas Adams

[57] ABSTRACT

A polarization-independent optical detection apparatus for measuring light output from optical fibers comprises an optical detector having an input port for receiving input light by way of an optical path and an output for a corresponding detection signal. A polarization-transformation element is rotatably mounted in the optical path so that the input light passes through the element to reach the input port. A drive motor rotates the polarization-transformation element in a plane extending transversely of the optical path. The polarization-transforming element is selected to transform the polarization state of the input light reaching the detector, as the element spins, so that, for any given input polarization state, the time averaged electrical signal from the detector is approximately the average electrical signal from the detector over all input polarization states.

8 Claims, 1 Drawing Sheet

ROTATING WAVEPLATE SYSTEM WITH AVERAGING OF THE DETECTED SIGNAL TO COMPENSATE FOR POLARIZATION DEPENDENCE

FIELD OF THE INVENTION

The invention relates to optical devices and is especially applicable to optical detectors for measuring light output from optical fibers.

BACKGROUND

Polarization-dependent loss (PDL), i.e. insertion loss dependent upon the state of polarization of the input light, is particularly undesirable in optical detectors. Various ways have been proposed to render an optical detector insensitive to the state of polarization of the input light. For example, it has been proposed to interpose in front of the optical detector an optical element which exhibits polarization-dependent loss approximately equal to that of the optical detector and orient the optical element and optical detector so that their polarization-dependent losses cancel. In theory, this technique should be capable of excellent results. In practice, however, differing characteristics of the optical element and optical detector make it difficult to match the amounts of polarization-dependent loss and orient the optical element to achieve the required cancellation over a wide wavelength and temperature range.

An alternative proposal involves interposing in front of the optical detector an optical element, such as Erbium doped optical fiber, which absorbs the polarized input light and spontaneously emits unpolarized light, at another wavelength, which is captured by the detector. Although this technique is capable of reducing the polarization dependence effects at the optical detector to very low levels, it requires restriction of the range of wavelengths of the input light and also results in low optical efficiency. Also, in order to make a low PDL measurement of the input power, the coupling of the input light into the Erbium doped fiber must be made in a manner which has low polarization dependence. These requirements limit the number of applications for this technique.

SUMMARY OF THE INVENTION

An object of the present invention is to eliminate or at least mitigate the above-mentioned problems and to provide an improved polarization-independent optical device suitable for optical fiber measurements.

According to the present invention, optical apparatus comprises an optical detector having an input port for receiving an input light beam by way of an optical path and an output for a corresponding detection signal, a polarization-transformation element mounted in the optical path so that the input light beam passes through the element to reach the input port, the polarization-transformation element altering transforming a state of polarization of the light beam passing therethrough in dependence upon relative displacement between the element and a plane of polarization of the input light beam, and drive means coupled to the polarization-transformation element for effecting repeated relative displacement between the element and a plane of polarization of the input light beam.

The apparatus may further comprises means for processing the detection signal and providing an output signal proportional to an average polarization state of the input light beam.

The polarization-transforming element may transform polarization state of the light beam in dependence upon angular displacement and the drive means be arranged to rotate the element. The polarization-transforming element, for example a half-wave retarder, preferably is selected to transform the polarization state of the input light reaching the detector as the element spins so that, for any given input polarization state, the time-averaged electrical signal from the detector is approximately the average electrical signal from the detector over all input polarization states.

In one preferred embodiment, the drive means comprises a drive motor having a hollow shaft with the polarization-transforming element and the optical detector disposed at opposite ends of the shaft.

In another preferred embodiment of the invention, apparatus for measuring input light comprises an optical detector having an input port to receive the input light by way of an optical path, and an output for providing a corresponding detection signal; a polarization-transforming element, for example a half-wave retarder, rotatably mounted in the optical path; drive means for rotating the element at a predetermined speed; and low-pass filter means coupled to the detector output and having a threshold significantly below a frequency corresponding to four times the number of revolutions per minute of the polarization-transforming element.

Various objects, features, aspects and advantages of the present invention will become more apparent from the following detailed description, taken in conjunction with the accompanying drawings, of preferred embodiments of the invention.

BRIEF DESCRIPTION OF DRAWINGS

Referring now to FIG. 1, a measuring apparatus for measuring input light from an optical fiber 10 comprises a polarization-independent optical detection device 12, an amplifier 14, a low-pass filter 16 and an analogue-to-digital converter 18. The polarization-independent optical detection device comprises an optical detector 20 and a rotatable polarization-transforming element 22. The optical detector 20 has an optical input port 24 and electrical output wires 26 connected to amplifier 14. The polarization-transforming element is disposed between the optical fiber 10 and an input port 24 of the optical detector 20 so that light from the optical fiber 10 must pass through the polarization-transforming element 22 in order to reach the optical detector 20.

Referring now to FIG. 3, which shows the polarization-independent detection device 12 in more detail, the polarization-transforming element 22 is a half-wave retarder, for example a double-plate waveplate designed to be a zero-order, half-wave retardance waveplate at the wavelength of most interest. A suitable such element is marketed by Karl Lambrecht as part number WPQ04-.25-V1550. The half-wave retarder 22 is supported, and rotated, by the hollow drive shaft 30 of a D.C. drive motor unit 28. One end of the hollow drive shaft 30 communicates with the input port 24 of optical detector 20. The half-wave retarder 22 is mounted upon the other end of hollow drive shaft 30 by means of a cylindrical mounting 32 which has coaxial sockets 34 and 36 in its opposite ends. The half-wave retarder 22 is located in one socket 34 and the end of drive shaft 30 fits into the other socket 36. A hole 38 communicates between the two sockets 34 and 36 and is the same diameter as cylindrical hole 40 through hollow drive shaft 28.

Figure 1:
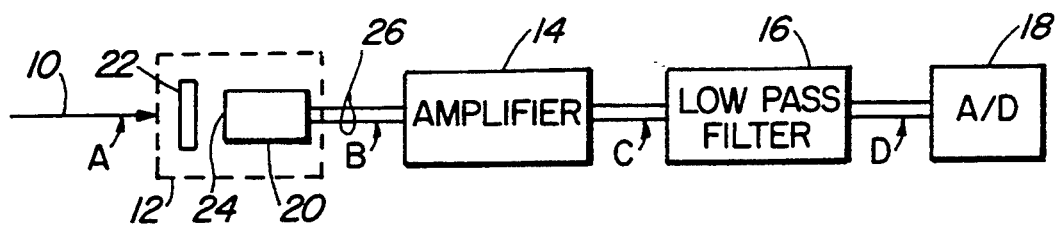
FIG. 1 is a schematic block diagram of measuring apparatus incorporating a polarization-independent optical detection device.

A lens 42 between the optical fiber 10 and the half-wave retarder 22 focuses light from the optical fiber 10 so that it passes through half-wave retarder 22, hole 38 and hollow drive shaft 28 to reach the optical detector 24.

In operation, the drive motor 28 rotates hollow drive shaft 30, and hence the half-wave retarder 22, at about 5,000 revolutions per minute. The rotation direction is not important to the performance of the device. The polarization-transforming element 22 is selected to transform the polarization state reaching the detector 20, as the element 22 rotates, so that, for any given input polarization state, the time-averaged electrical signal from the detector 20 is approximately the average electrical signal from the detector 20 over all input polarization states.

Figure 3:
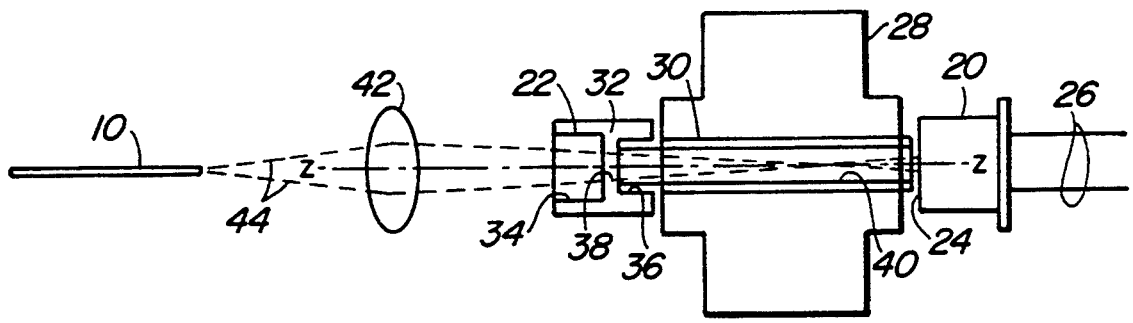
FIG. 3 is a schematic side view of the polarization-independent optical detector device.

The dimensions of the various components are chosen so that no "vignetting" of the light beam occurs. In FIG. 3, the extremes of the light beam are indicated by dashed lines 44. In a practical embodiment, satisfactory performance was obtained when the focal length of lens 42 was 10 mm. and the diameters of the detector input port 24 and the hole 40 were 3 mm.

Figures 2A, 2B, 2C:
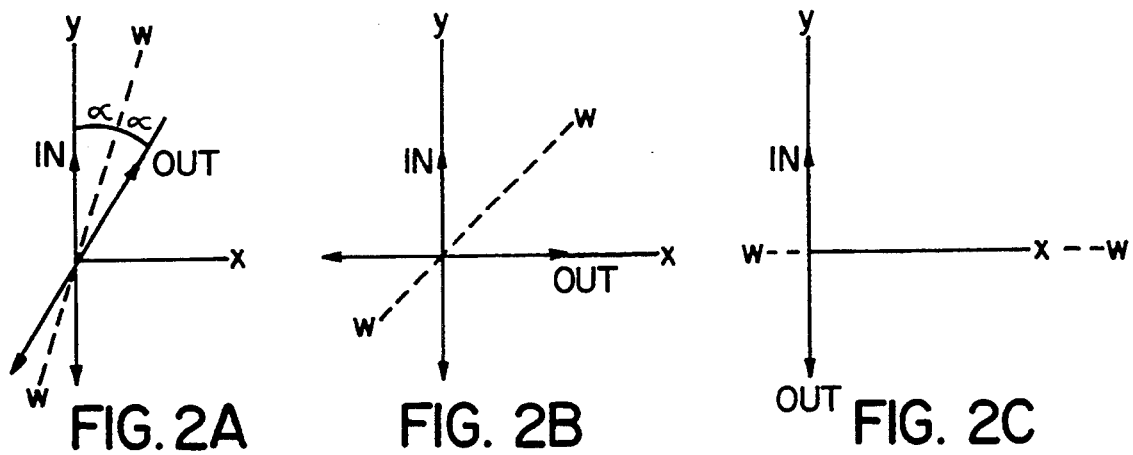
FIGS. 2A, 2B and 2C are vector diagrams illustrating operation of a polarization-transforming element of the detection device of FIG. 1.

The manner in which the half-wave retarder 22 rotates the orientation of a linearly polarized light beam is illustrated in FIGS. 2A, 2B and 2C which depict rotation of the half-wave retarder 22 and thus its optical axis W—W about longitudinal axis Z—Z (FIG. 3) relative to the plane of polarization of the input light which, in FIGS. 2A, 2B and 2C, is shown aligned with the y-axis.

As shown in FIG. 2A, the half-wave retarder 22 rotates the orientation of the input light by twice the angle $\alpha$ between its optical axis W—W and the input light polarization plane y of the input light beam. Hence, the output light beam leaves the half-wave retarder 22 displaced by an angle $2\alpha$ degrees relative to the input light beam.

In FIG. 2B, the half-wave retarder 22 has rotated through 45 degrees relative to the y axis. Consequently, the output light beam has its plane of polarization rotated through 90 degrees relative to the input light beam and so is aligned with the x axis. In FIG. 2C, the half-wave retarder 22 has rotated through ninety degrees relative to the y axis and the output light beam has its plane of polarization returned to align with the y axis. In this case, the output polarization state and input polarization state are the same.

Hence, it can be seen that the plane of polarization of the light beam leaving the half-wave retarder 22 rotates at double the speed of rotation of the half-wave retarder 22 itself.

Typically, a detector will have highest responsivity to linearly polarized light along one axis (x) and lowest responsivity to linearly polarized light at 90 degrees to the x-axis (i.e. the y-axis). This is due to the detector having different responsivities to the $E_x$ and $E_y$ components of the light intensity. Circularly polarized light has equal $E_x$ and $E_y$ components, as does elliptically or linearly polarized light at a 45 degree angle. Other polarization states do not, but if the light passes through a half-wave retarder which is turned through a quarter revolution, or a multiple of quarter revolutions, then the time averaged $E_x$ and $E_y$ components will be equal. If the number of revolutions in the average time is large, then it does not make a significant difference if the number of revolutions is not an exact multiple of quarter revolutions.

Figures 4A, 4B, 4C, 4D:
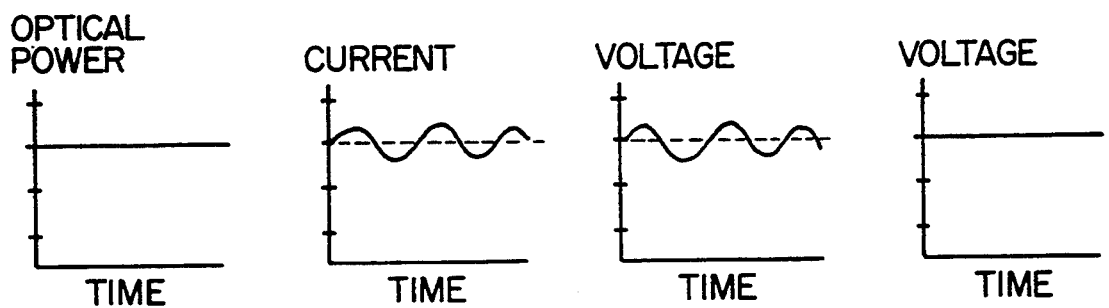
FIGS. 4A, 4B, 4C and 4D illustrate signal waveforms at various parts of the system of FIG. 1.

Referring again to FIG. 3, when the input light beam has constant mean optical power, as illustrated in waveform diagram FIG. 4A, the output of the optical detector 20 will be a current which, as illustrated in FIG. 4B, has a d.c. component and a superimposed ripple which has a sinusoidal waveform and a frequency four times the rotation speed of the half-wave retarder 22. Thus, in the practical implementation where the motor 30 rotated the half-wave retarder 22 at 5,000 rpm, the ripple frequency was 333 Hz.

Amplifier 14 converts the output of the optical detector 20 to a voltage with the same waveform, as shown in FIG. 4C. Low pass filter 16, with a cut-off frequency of 50 Hz., i.e well below the frequency of the sinusoidal ripple waveform, removes the sinusoidal waveform to leave the average D.C. component signal, shown in FIG. 4D. This D.C. signal is converted by analogue-digital converter 18, with an average time of 0.1 seconds, to provide a digital output signal representing the measured optical power for the input light from optical fiber 10.

Such a polarization-insensitive detection system has been found to have a polarization sensitivity more than 10 times less than that of the same detector used in a normal configuration.

The lens 42 may exhibit some birefringence, but its effects can be ameliorated by keeping the light beam diameter smaller than the diameter of the detector, which has a quite uniform responsivity across its surface.

Although the light passing though the half-wave retarder is not collimated, the performance of the half-wave retarder was not significantly affected because the angle of convergence was relatively small.

Embodiments of the invention may be arranged to accept the cleaved ends of optical fibers directly, or accept connectorized fiber ends.

It should be appreciated that the optical detector of the present invention is not limited to use with optical fibres. The input light may be coupled in other ways, for example as a free space light beam. The manner of coupling the input light is not important so long as the clear apertures and acceptance angles of the polarization-transforming element 22 and the optical detector 20 are not exceeded and so long as any polarization dependence introduced by the coupling mechanism is not excessive.

The invention embraces various modifications of the described embodiment. For example, the polarization-transformation element might be a device other than a half-wave retarder, such as a Faraday rotator. Moreover, although the device shown in FIG. 3 has the polarization-transformation element 22 rotated about an axis parallel to the axis Z—Z, it is envisaged that it might be rotated about a transverse axis.

Embodiments of the invention advantageously exhibit such features as low polarization dependence, satisfactory performance over a wide range of wavelengths, high optical efficiency, and reasonable insensitivity to the polarization dependent loss characteristics of the optical detector itself.

Although embodiments of the invention have been described and illustrated in detail, it is to be clearly understood that the same is by way of illustration and example only and is not to be taken by way of the limitation, the spirit and scope of the present invention being limited only by the appended claims.

What is claimed is:

1. Optical apparatus comprising an optical detector having an input port for receiving input light by way of an optical path and an output for a corresponding detection signal, a polarization-transformation element mounted in the optical path so that the input light passes through the element to reach the input port, the polarization-transformation element transforming a particular of polarization of a light beam passing therethrough in dependence upon relative angular displacement between the element and a plane of polarization of the input light beam, drive means coupled to the polarization-transformation element for rotating the element relative to the input light beam plane of polarization, and means for processing the detection signal and providing an output signal substantially independent of polarization state of the input light beam.

2. Optical apparatus as claimed in claim 1, wherein the processing means comprises a low-pass filter having a threshold frequency determined according to a predetermined rotation speed of the polarization-transformation element.

3. Optical apparatus as claimed in claim 1, wherein the drive means comprises a drive motor having a hollow drive shaft, the polarization-transformation element and the optical detector being mounted at opposite ends of the drive shaft, the arrangement being such that input light passes through the element and the drive shaft before entering the input port.

4. Optical apparatus as claimed in claim 1, wherein the polarization-transformation element comprises a half-wave retarder.

5. Optical apparatus comprising an optical detector having an input port for receiving input light by way of an optical path and an output for a corresponding detection signal, a polarization-transformation element mounted in the optical path so that the input light passes through the element to reach the input port, the polarization-transformation element transforming a particular state of polarization of a light beam passing therethrough in dependence upon relative angular displacement between the element and a plane of polarization of the input light beam, drive means coupled to the polarization-transformation element for rotating the element relative to the input light beam plane of polarization.

6. Optical apparatus as claimed in claim 5, wherein the drive means comprises a drive motor having a hollow drive shaft, the polarization-transformation element and the optical detector being mounted at opposite ends of the drive shaft, the arrangement being such that input light passes through the element and the drive shaft before entering the input port.

7. Optical apparatus as claimed in claim 5, wherein the polarization-transformation element comprises a half-wave retarder.

8. Apparatus for measuring light input thereto, comprising an optical detector having an input port to receive the input light by way of an optical path, and an output for providing a corresponding detection signal, a half-wave retarder rotatably mounted in the optical path, drive means for rotating the half-wave retarder at a predetermined number of revolutions, and low-pass filter means coupled to the detector output and having a threshold significantly below a frequency corresponding to four times a number of revolutions per minute of the half-wave retarder.

* * * * *